(12) United States Patent
Chavez et al.

(10) Patent No.: US 9,053,594 B2
(45) Date of Patent: Jun. 9, 2015

(54) MONITORING OBJECTS IN MOTION ALONG A STATIC ROUTE USING SENSORY DETECTION DEVICES

(75) Inventors: Salvador E. Chavez, Somerset, NJ (US); David J. Delia, Lagrangeville, NY (US); Wayne M. Delia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1331 days.

(21) Appl. No.: 12/243,783

(22) Filed: Oct. 1, 2008

(65) Prior Publication Data

US 2010/0079303 A1 Apr. 1, 2010

(51) Int. Cl.
| G08B 21/00 | (2006.01) |
| G07C 1/24 | (2006.01) |
| H04N 7/18 | (2006.01) |
| H04L 29/08 | (2006.01) |

(52) U.S. Cl.
CPC .................. *G07C 1/24* (2013.01); *H04N 7/188* (2013.01); *H04L 67/125* (2013.01); *H04L 67/12* (2013.01)

(58) Field of Classification Search
CPC ....... H04N 7/181; H04N 7/188; G06K 17/00; G08B 13/19608; G08B 13/19641; G08B 13/1645; G07C 1/24
USPC ........ 340/8.1, 988, 991, 993, 539.13, 539.22; 342/357.4, 457, 357.59, 357.52, 342/357.395
See application file for complete search history.

(56) References Cited

U.S. PATENT DOCUMENTS

| 5,483,664 A | * | 1/1996 | Moritz et al. ................ 455/428 |
| 5,511,233 A | * | 4/1996 | Otten ............................ 455/524 |
| 5,579,013 A | * | 11/1996 | Hershey et al. ............ 342/357.4 |
| 5,889,492 A | * | 3/1999 | Kurby et al. ............. 342/357.52 |
| 6,359,647 B1 | * | 3/2002 | Sengupta et al. ............. 348/154 |
| 6,545,705 B1 | * | 4/2003 | Sigel et al. ................... 348/157 |
| 6,597,859 B1 | | 7/2003 | Leinhart et al. |
| 7,123,126 B2 | * | 10/2006 | Tanaka et al. .................. 340/5.2 |
| 7,242,423 B2 | * | 7/2007 | Lin .............................. 348/169 |
| 7,248,778 B1 | | 7/2007 | Anderson et al. |
| 7,357,299 B2 | * | 4/2008 | Frerking ....................... 235/375 |

(Continued)

OTHER PUBLICATIONS

Yu, T. et al., "Retrieval of video clips using global motion information," Electronics Letters, Jul. 5, 2007, vol. 37, No. 14, pp. 893-895.

*Primary Examiner* — Van Trieu
(74) *Attorney, Agent, or Firm* — Ronald A. Kaschak; Keohane & D'Alessandro PLLC; Hunter E. Webb

(57) ABSTRACT

A system for monitoring a plurality of objects in motion (OIMs) along a static route using a plurality of sensory detection devices, the static route having a plurality of route portions, each route portion having an entering boundary and an exiting boundary, at least one OIM being a designated OIM and having a tag indicating the location of the designated OIM along the route, the system comprising a plurality of sensory detection devices corresponding to the plurality of route portions for monitoring activity in each of the plurality of route portions and for providing monitor output representing activity within each of the plurality of route portions, a plurality of data stores corresponding to each of the plurality of route portions for receiving and storing the monitor output for each of the plurality of route portions, and a plurality of location detectors communicative with the tag of the designated OIM for identifying the location of the designated OIM, each location detector providing output when the designated OIM is located within a route portion.

18 Claims, 8 Drawing Sheets

(56) References Cited

U.S. PATENT DOCUMENTS

| | | |
|---|---|---|
| 2004/0062525 A1 | 4/2004 | Hasegawa et al. |
| 2006/0092072 A1 | 5/2006 | Steiner |
| 2006/0273903 A1 | 12/2006 | Kim et al. |
| 2006/0283938 A1* | 12/2006 | Kumar et al. ................. 235/382 |
| 2007/0018952 A1* | 1/2007 | Arseneau et al. ............. 345/156 |
| 2007/0182818 A1* | 8/2007 | Buehler ......................... 348/143 |
| 2007/0287596 A1 | 12/2007 | Case, Jr. et al. |
| 2009/0040301 A1* | 2/2009 | Sandler et al. ................ 348/143 |

\* cited by examiner

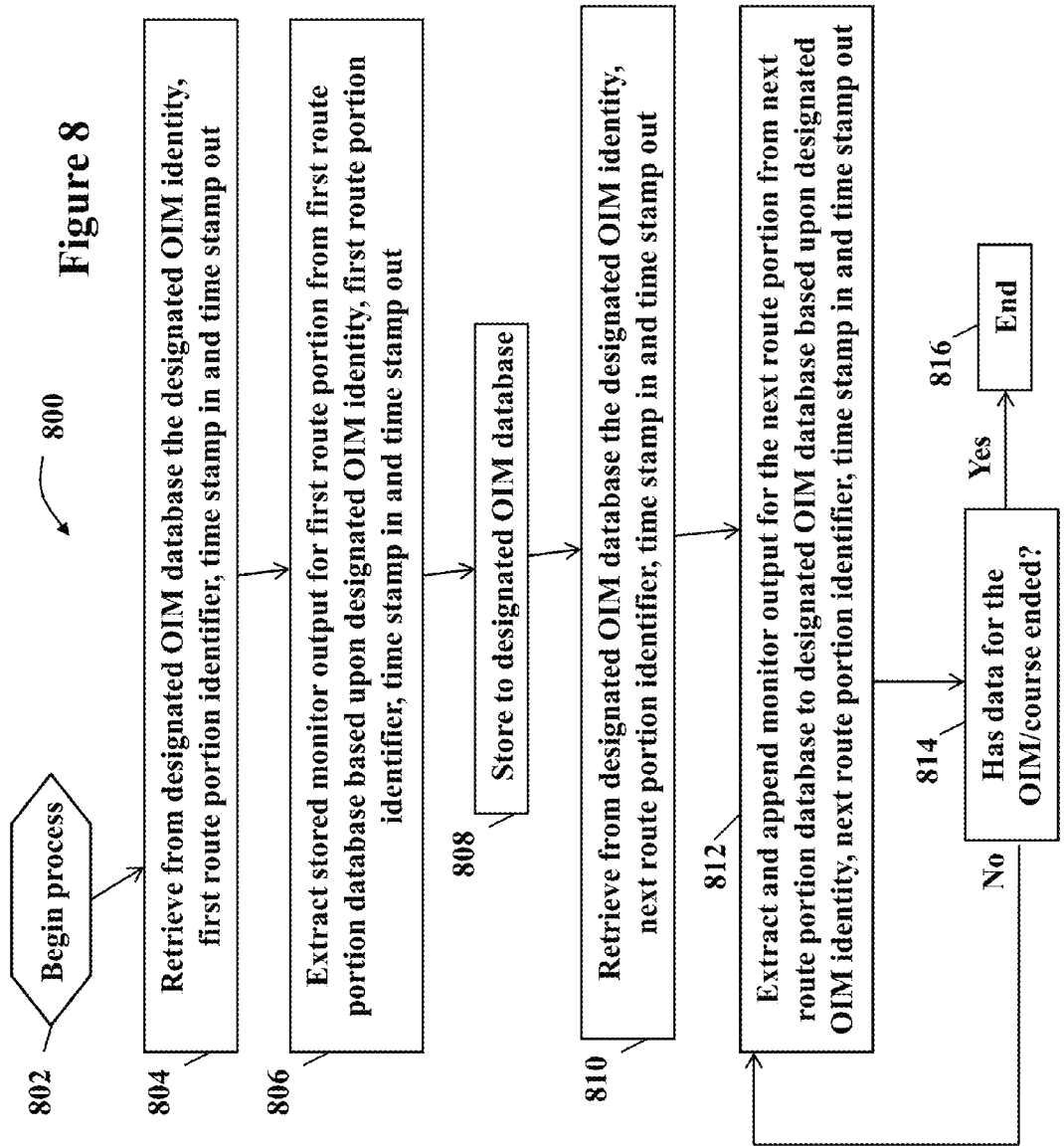

MONITORING OBJECTS IN MOTION ALONG A STATIC ROUTE USING SENSORY DETECTION DEVICES

FIELD OF THE INVENTION

Aspects of the present invention relate generally to monitoring objects in motion (OIMs) and, more particularly, to monitoring OIMs along a static route using sensory detection devices.

BACKGROUND OF THE INVENTION

It is often desired to monitor the progress and performance of an object in motion (OIM) along the course of a static route. The monitoring of a single OIM, when there are multiple OIMs moving along the same route, can be difficult. The monitoring of the OIMs may be accomplished through use of video recording, audio recording, or continuous measurement of environmental parameters. Long distance routes and large numbers of OIMs lead to the use of multiple video cameras, audio recorders, or other measurement devices associated with defined route portions. Very common applications of OIM monitoring include the following situations: marathon races (a large number of participants, a moderate velocity, a long route); NASCAR® automotive races (a moderate number of participants, a high velocity, many repetitions of a moderately long route); golf matches (a moderate number of participants, a low velocity, a moderately long route); and manufacturing production environments (a large number of OIMs, a low velocity, a relatively short route). (NASCAR® is a registered trademark of National Association for Stock Car Auto Racing, Inc.)

In the case of athletic performance or competition, the OIM is most commonly a participant in the event. It is often desirable to monitor the progress of a particular participant both in a real time environment (as the event is happening) and in a post-production customized video recording of the performance after the event is concluded. Traditional video coverage of, e.g., racing events or golf tournaments tend to focus on the leaders or individual outstanding performances of other participants and the final video production of the event typically consists of a single version of edited content. Analysis of the performance of a single participant often requires dedicated camera operators or extensive, labor-intensive video editing tasks to reduce raw camera video feeds to customized post-production video results.

Innovation in such sporting events, such as NASCAR race coverage, includes video cameras mounted in or on individual cars, and fixed video cameras aimed at certain pit areas. It is prohibitively expensive to provide the same level of coverage for all cars in the race, or for all participants in other sporting events, such as in a marathon race or golf match. The final video product will not be of much help to a mid-level participant if the resulting content mostly features coverage of the leaders.

In a manufacturing production environment, monitoring devices may include fixed cameras, microphones, thermometers, barometers, and other sensory instruments to provide total coverage of work in process (WIP) moving through manufacturing sectors. However, analysis of a single OIM through these manufacturing sectors is extremely difficult to produce, and typically must be done in an essentially manual technique, such as visually scanning through long sections of video to determine and track the object of interest.

SUMMARY OF THE INVENTION

In general, aspects of the present invention provide a system and a method for monitoring OIMs along a static route having multiple segments or portions using sensory detection devices in each of those segments or portions. The sensory detection devices provide outputs corresponding to the activity occurring within each respective route segment or portion. In one embodiment of the present invention, the system and the method allow for the outputs of the sensory detection devices to be streamed in real time to a user. As the OIM moves from one segment or portion to the next, the system and method allow for changing the sensory detection device feed providing the streamed output from one sensory detection device to the next sensory detection device.

In one embodiment, the present invention provides a method for monitoring objects in motion (OIMs) along a static route using a system having sensory input devices, the static route having route portions, each route portion having at least one sensory input device for monitoring OIM activity in that route portion, the method comprising receiving an indication identifying a designated OIM, determining if the designated OIM is entering a route portion, if the designated OIM is entering a route portion, generating monitored output representing activity in that route portion using the at least one sensory input device for that route portion, streaming the monitored output for that route portion to a user, determining if the designated OIM is exiting out of the route portion, if the designated OIM is exiting out of the route portion, determining if there are any more route portions and, if there are more route portions, returning to the determining if the designated OIM is entering a route portion step, and if there are no more route portions, stopping the streaming to the user.

In another embodiment, the present invention provides a method for monitoring objects in motion (OIMs) along a static route using a system having a plurality of sensory detection devices, the static route having a plurality of route portions, each route portion having at least one sensory detection device for monitoring OIM activity in that route portion and generating a monitor output representing the OIM activity in that route portion, the method comprising receiving an indication identifying a designated OIM, generating monitor outputs for each route portion, storing the monitor outputs in respective route portion databases along with a time of storage value, determining if the designated OIM is located in a route portion, and if the designated OIM is located in a route portion, storing a time of entry and a time of exit into and from that route portion in a designated OIM database.

Another embodiment is a system for monitoring a plurality of objects in motion (OIMs) along a static route using a plurality of sensory detection devices, the static route having a plurality of route portions, each route portion having an entering boundary and an exiting boundary, at least one OIM being a designated OIM and having a tag indicating the location of the designated OIM along the route, the system comprising a plurality of sensory detection devices corresponding to the plurality of route portions for monitoring activity in each of the plurality of route portions and for providing monitor output representing activity within each of the plurality of route portions, a plurality of data stores corresponding to each of the plurality of route portions for receiving and storing the monitor output for each of the plurality of route portions, and a plurality of location detectors communicative with the tag of the designated OIM for identifying the location of the designated OIM, each location detector providing output when the designated OIM is located within a route portion.

In another embodiment, disclosed is a computer program product embodied in a computer readable medium for operating in a system comprising a processing unit, a memory, a bus, and input/output (I/O) interfaces, for implementing a method for monitoring objects in motion (OIMs) along a static route using a system having sensory input devices, the static route having route portions, each route portion having at least one sensory detection device for monitoring OIM activity in that route portion, the method comprising receiving an indication identifying a designated OIM, generating monitor outputs for each route portion, storing the monitor outputs in respective route portion databases along with a time of storage value, determining if the designated OIM is located in a route portion, and if the designated OIM is located in a route portion, storing a time of entry and a time of exit into and from that route portion in a designated OIM database.

The present invention further comprises a method for deploying a computing infrastructure comprising integrating computer-readable code into a computing system, wherein the code in combination with the computing system is capable of performing a process for monitoring objects in motion (OIMs) along a static route using a system having sensory input devices, the static route having route portions, each route portion having at least one sensory input device for monitoring OIM activity in that route portion, the process comprising receiving an indication identifying a designated OIM, generating monitor output representing activity in each route portion using the at least one sensory input device for each route portion, storing the monitor output from each route portion in a route portion database for that route portion along with a time of storage, determining if the designated OIM is entering a route portion, if the designated OIM is entering a route portion, generating a time stamp in representing the time the designated OIM entered the route portion, storing the time stamp in, an identifier for the designated OIM and an identifier for the route portion, determining if the designated OIM is exiting the route portion, if the designated OIM is exiting the route portion generating a time stamp out representing the time that the designated OIM exited the route portion, and determining if there are any more route portions and, if there are more route portions, returning to determining if the designated OIM is entering a route portion.

BRIEF DESCRIPTION OF THE DRAWINGS

These and other features of this invention will be more readily understood from the following detailed description of the various aspects of the invention taken in conjunction with the accompanying drawings in which:

FIG. 8 illustrates an embodiment of a method for extracting monitor outputs from various data storage units corresponding to various route portions or segments and consolidating the monitor outputs into a designated OIM data store of the present invention.

Figure 1:
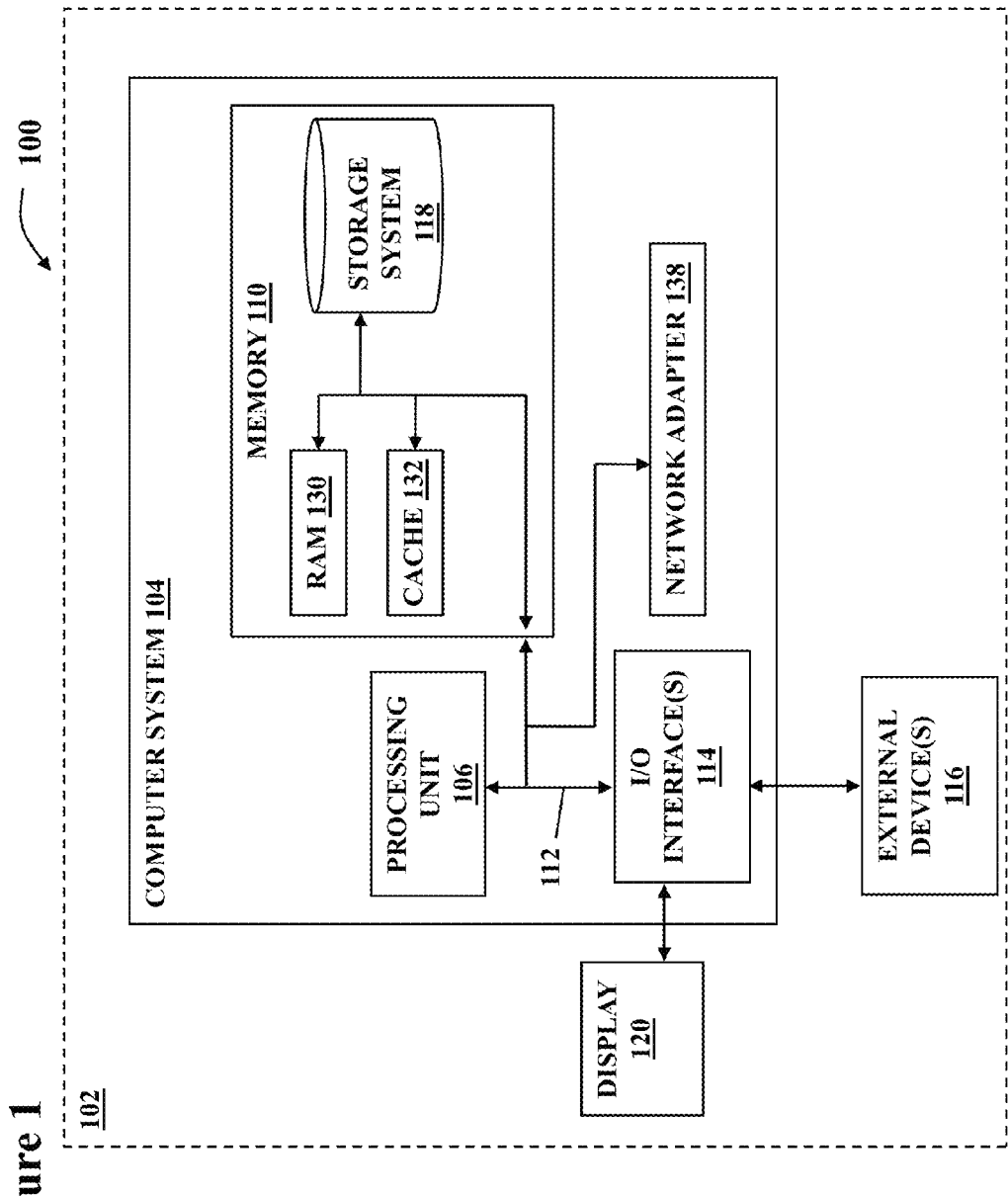
FIG. 1 shows a data processing system suitable for implementing an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Aspects of the present invention provide a solution for monitoring OIMs along a static route using sensory detection devices.

The system and method of the present invention may utilize a method of tagging an OIM with either global positioning system (GPS) or radio-frequency identification (RFID) technology to determine the location of the OIM as it passes through a static route. (GPS technology is capable of identifying the current location of an OIM that is equipped with a GPS receiver while moving through a static route. RFID is an automatic identification method that may be used to identify location.) An OIM outfitted with a GPS receiver can transmit the location/time data wirelessly (e.g., from onboard transmitters installed in NASCAR vehicles) to central processing units to be used as input to application programs. Alternatively, an OIM can be outfitted with RFID tags, and RFID readers can register the entrance or exit of an OIM into or out of a sector or route portion of the fixed route. Fixed RFID readers can be equipped with wired or wireless data transmission capability.

The route is subdivided into sectors, or route portions, and one or more monitoring device is assigned to each route portion. Examples of monitoring devices include fixed video cameras, microphones, thermometers, barometers, and/or other sensory detection devices. Digital video, audio, and parametric data recording includes the capability of associating a start and end time stamp to sub-sections of video. These devices are installed to continuously monitor the activity in their assigned sectors or route portions. The monitored activity is recorded as digital data streams and stored in a database assigned to each sector or route portion.

The present invention utilizes a data processing application that receives input generated from the location-determining technologies associated with each OIM, keeping record of the entrance into or exit from each pre-defined sector that is set up with digital sensory input recording. Each sensory-detecting instrument (monitor) in each defined sector (route portion) produces a digital data stream of identifying the activities within the corresponding sector and are stored in a database associated with that particular sector or route portion. The separate data streams may be indexed with time stamp data.

The present invention utilizes an application program that may extract the sensory data associated with a particular OIM of interest, and forms a real-time transmission of the data or a post-production "highlight film" of data customized to the selected OIM.

In one embodiment of the present invention, real time monitoring capability is provided. In this embodiment, a particular OIM may be designated to be highlighted in a continuous audio/video stream, such as one streamed from a web site server. When the application system detects that the OIM of interest has moved from one sector or route portion to another, e.g., from sector X to sector Y, the sensory detection device (e.g., video) feed is switched from the feed covering sector X to the feed covering sector Y. As an example, suppose each of the 18 holes in a golf course is fitted with three fixed cameras: one aimed at the tee box, one aimed at the fairway, and one aimed at the green. A golfer is outfitted with an RFID indicator or GPS receiver, either of which is capable of indicating when the golfer enters and exits each of the three defined sectors on each hole. As the golfer leaves the tee box and walks down the fairway, a web site streaming audio and video of this particular golfer switches from the real time video feed covering the tee box to the real time video feed covering the fairway. A service can be established to offer specialized, customized audio/video event coverage of a chosen participant at a purchase or subscription cost.

In another embodiment of the present invention, post-production capability is provided. In this embodiment, the system and method of the present invention provide the capability to designate a particular OIM to be highlighted and extracts video information at different points from the completed video feed files based on the accumulated time stamp in and time stamp out data recorded for each sector entrance and exit by the OIM. For example, if a golfer wishes to produce a customized video feed of his/her performance in a golf tournament, the method and system of the present invention may identify relevant sub-sections in each of the audio/video feed files, extracting these sub-sections, and assembling them into a custom-made video of that particular golfer's performance.

A system, such as System 100, may have a data processing system, such as Data Processing System 102 shown in FIG. 1, suitable for storing and/or executing program code of the present invention, and may include a computer system, such as Computer System 104, having at least one processing unit (Processing Unit 106) coupled directly or indirectly to memory elements (Memory 110) through a system bus, such as System Bus 112. Memory 110 may include local memory (RAM 130) employed during actual execution of the program code, bulk storage (Storage 118), and cache memories (Cache 132) that provide temporary storage of at least some program code in order to reduce the number of times code must be retrieved from Storage 118 during execution. Input/output or I/O devices (such as Display 120, and other external devices (External Devices 116), including but not limited to keyboards, pointing devices, etc.)) may be coupled to Computer System 104 either directly or through intervening I/O controllers (I/O Interface(s) 114). Network adapter(s) (Network Adapter 138) may provide access to external networks.

Figure 2:
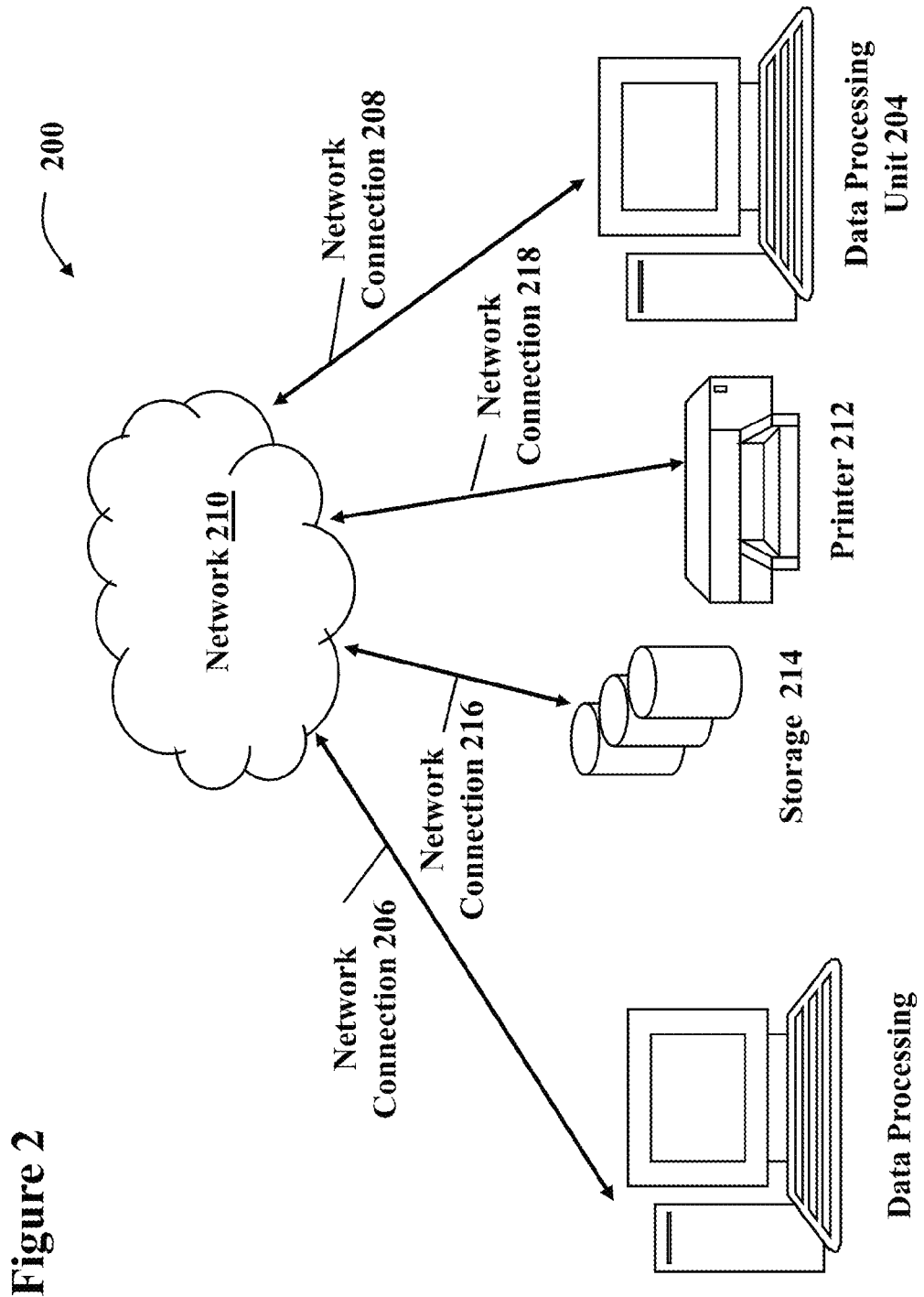
FIG. 2 shows a network for implementing an embodiment of the present invention.

FIG. 2 illustrates a networked system, such as System 200 to enable a data processing system (Data Processing Unit 202) to be coupled through network connection(s) (Network Connection 206, 208, 216, 218) to other data processing systems (Data Processing Unit 204), remote printers (Printer 212) and/or storage devices (Storage 214) through intervening private and/or public network(s) (Network 210). (A computer network is composed of multiple computers connected together using a telecommunication system for the purpose of sharing data, resources and communication. Modems, cable modem and Ethernet cards are just a few of the currently available types of network adapters.)

Figure 3:
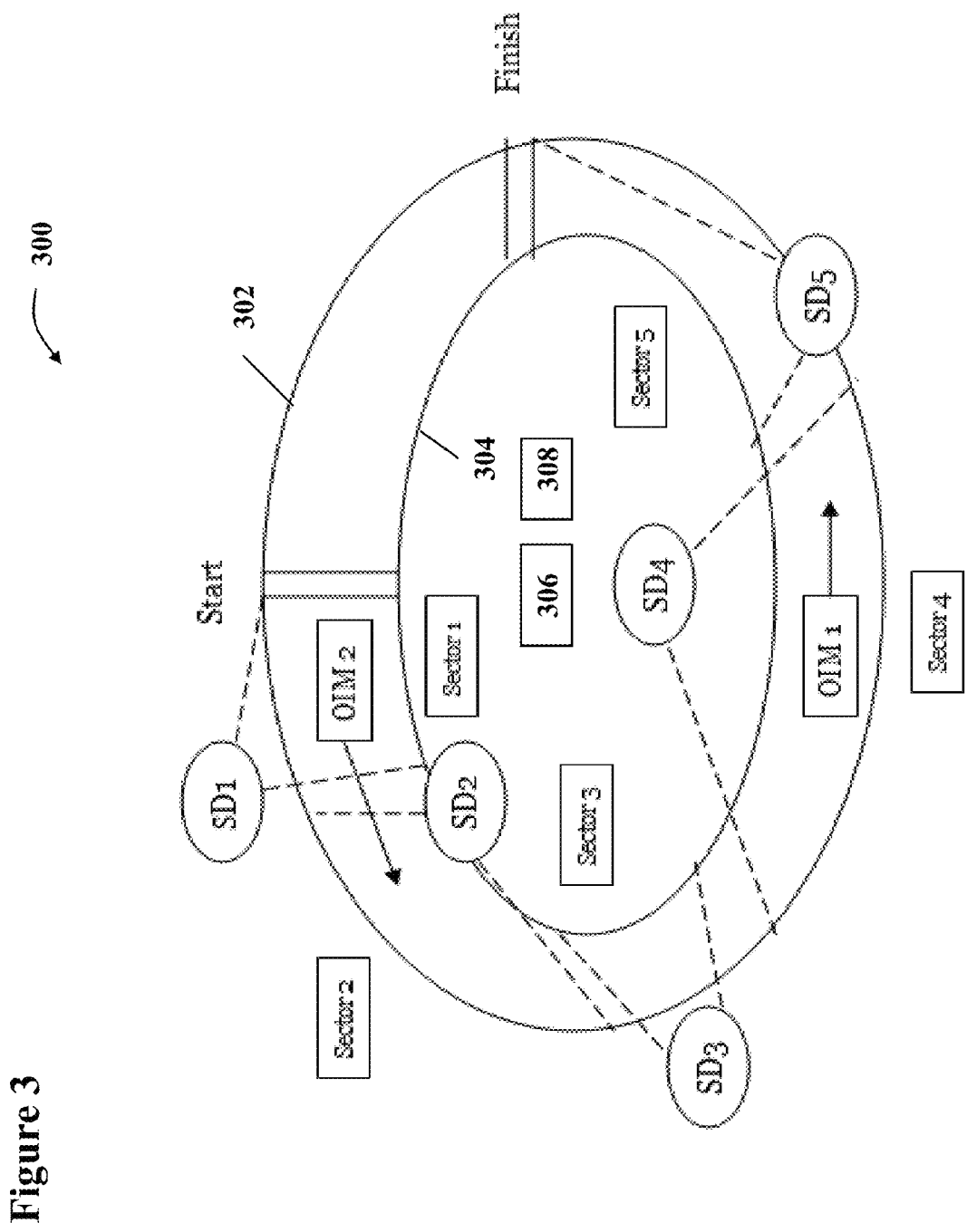
FIG. 3 illustrates an embodiment of the system of the present invention having two objects in motion (OIMs) traveling along a static path.

FIG. 3 illustrates an example static route 300 having concentric ovals 302, 304 representing a static course over which two Objects In Motion (OIM1, OIM2) travel. Along the course are five fixed sensory detection devices (SDDs) labeled SD1 through SD5, recording continuous streams of data concerning the performance of the two OIMs. Each sensory detection device records data from a corresponding sector (labeled Sector 1-Sector 5) of the static course. That is, SD1 records data from Sector 1 in a data store (not shown), SD2 records data from Sector 2 in another data store, and so on. Each OIM is equipped with a positional determination and identity notification device, such as a GPS receiver or an RFID tag or transponder. In the case where the OIM has a GPS receiver, it must also have a wireless transmitter to transmit its identity and position to the SDD recording data in that sector (route portion) or to an application computer system, such as Application Consolidation System 306. Each SDD must have a wireless receiver for receiving the wireless transmissions. In the case where the OIM utilizes an RFID tag or transponder, each SDD must include an RFID reader for receiving the identity of the OIM entering or exiting the range of sensory detection, along with the fixed location coordinates of each SDD.

As an OIM progresses along the static course, application data is accumulated reflecting the current position of the OIM that is associated with a corresponding SDD currently recording the performance of the OIM. Transmission of data recorded by the various SDDs for a particular OIM is customized to the data streams produced by the SDD in the sector currently occupied by the OIM of interest. As an illustration, suppose the SDDs are video cameras and the designated OIM is a particular automobile in a NASCAR race. As the designated OIM travels through the sectors (route portions) of the static race track, the GPS receiver embedded in the car indicates when the car exits one sector and enters the next sector. This indication is used by a Streaming Unit 308 to trigger a change from the video feed for the previous sector to the video feed for the next sector, and this transmission of "real time" video is delivered to those who have requested video coverage for this particular car. It should be noted that streaming function may be provided by Application Consolidation System 306.

After the OIM has completed its course, the data streams of performance or environmental parameters recorded at each SDD are available in separately stored datasets. The application consolidation system stores tables of information about which OIM entered which sector at what time. The application computer system then extracts monitored output segments from the several different datasets, and assembles that data into a continuous (or nearly continuous) customized data stream in a sequential manner based upon enter time stamps and exit time stamps.

The extraction of the relevant data stream segments is entirely driven by an automatic detection of the timing and position of the OIM along the defined sectors comprising a static course.

Figure 4:
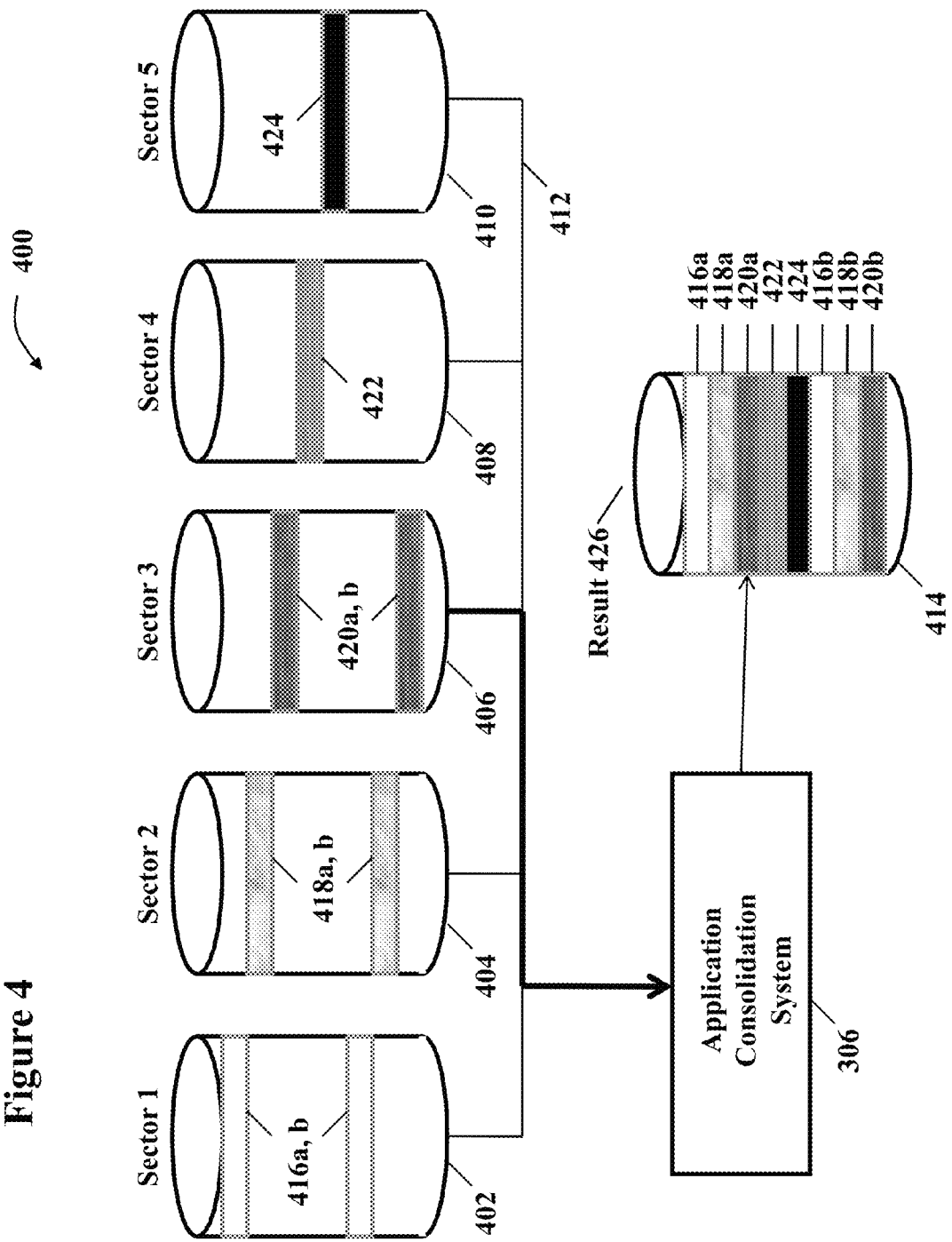
FIG. 4 illustrates an embodiment of the present invention having data storage for the route segments and an application consolidation system for consolidating monitor data from various sources.

FIG. 4 illustrates an embodiment 400 of a system of the present invention for extracting monitor output data associated with a designated OIM from the data stores, such as Data Stores 402, 404, 406, 408, 410, associated with each of the route portions, such as Sector 1, Sector 2, Sector 3, Sector 4, Sector 5, and consolidating the monitor data into a single designated OIM data store, such as Designated OIM Data Store 414 to result in Result 426. For instance, the Sector 1 SDD detects data in Sector 1 and provides Monitor Outputs 416a, b for storage in Data Store 402. Monitor Outputs 416a, b represent the activity in Sector 1 while an OIM of interest, or designated OIM, was passing through Sector 1. With respect to Data Store 402, it can be seen that the designated OIM passed through Sector 1 twice as represented by two Monitor Outputs 416a, b. SD1 detects the designated OIM entering Sector 1 by detecting the OIM's location indicator tag at the Sector 1 entrance and detects its exit from Sector 1 by detecting the tag at the exit. Once the designated OIM passes from Sector 1 to Sector 2, SD1 stops storing activity data for the designated OIM and SD2 begins storing activity data and providing a monitor output to Data Store 404 as indicated by Monitor Outputs 418a, b. The same procedure is followed for Sector 3 (Monitor Outputs 420a, b), Sector 4 (Monitor Output 422), and Sector 5 (Monitor Output 424). The data associated with the OIM's entrance into and exit out of each sector may be stored in Application Consolidation System 306 or Designated OIM Data Store 414.

It should be noted that an alternative embodiment does not require stopping of storing of data in the data stores. Rather, it could be that the data is stored continuously and then later extracted based upon OIM ID and time stamps.

Application Consolidation System 306 is connected to each data store via the data bus for passing/receiving control signals and data to/from the data stores. Application Consolidation System 306 extracts the stored activity data (monitored output) from each data store in a sequential manner such that the monitored output from first sector that the designated OIM passes through is the first monitored output (416a) extracted. The extracted monitored output (416a) is then stored in Designated OIM Data Store 414.

Application Consolidation System 306 then extracts the next stored activity data (monitor output) from next sector that the designated OIM passes through, or Monitor Output 418a in the present example. Application Consolidation System 306 then stores Monitor Output 418a in Designated OIM Data Store 414. Application Consolidation System 306 continues this process until all of the stored activity data is extracted from each data store and stored in sequential order in Designated OIM Data Store 414 thereby forming a resulting compiled data file of the designated OIM.

Figure 5:
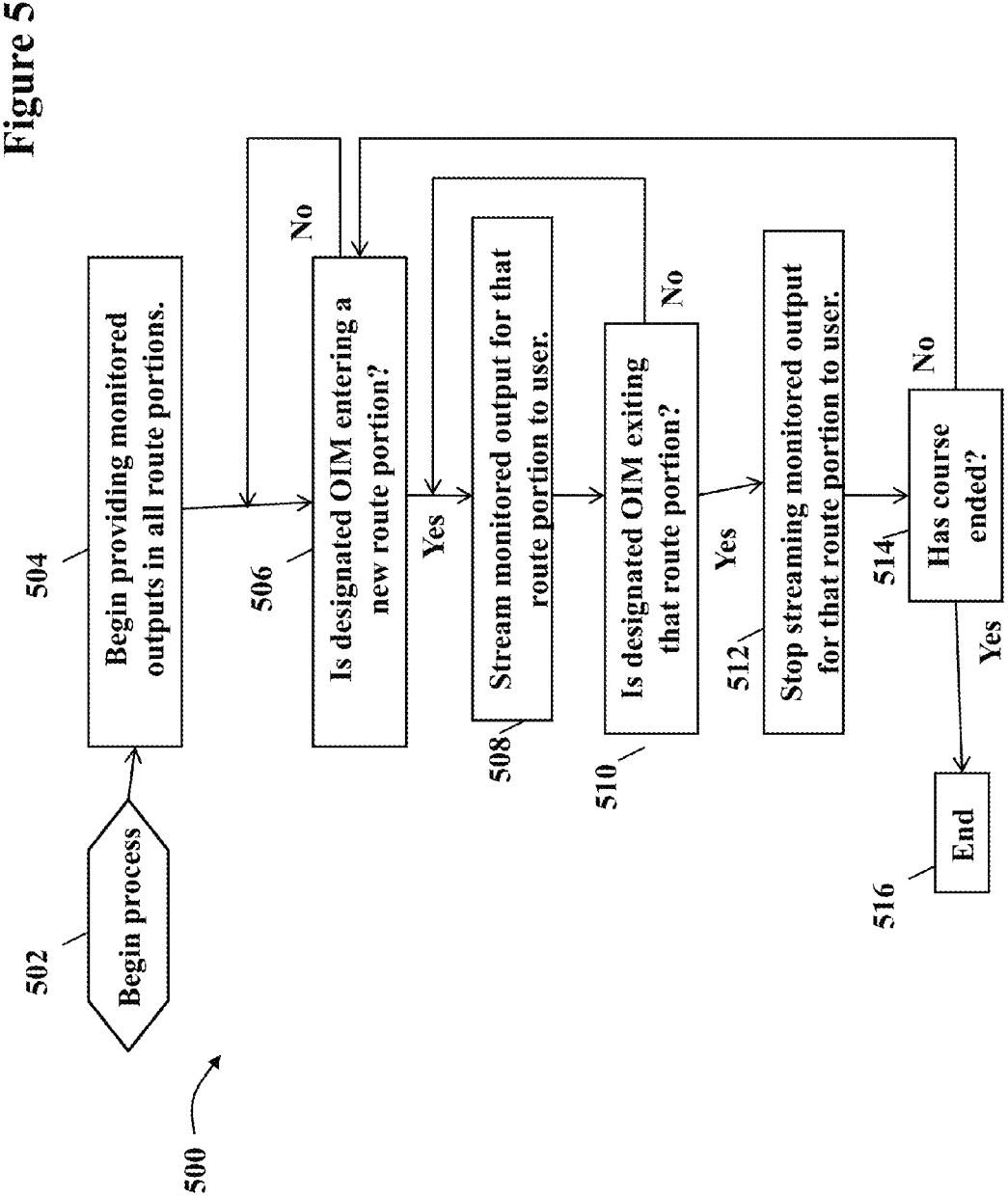
FIG. 5 illustrates one embodiment of the method for streaming monitor output from various route portions to a user.

FIG. 5 illustrates a process 500 for streaming data in real time to a user of the activities of an OIM of interest. At 502, the process begins and, at 504, each SDD provides monitor outputs in each respective route portion. At 506, it is determined whether the designated OIM (OIM of interest) is entering a new route portion and, if not, the process continues to monitor if the designated OIM is entering a new route portion. If so, the monitor data for that route portion is streamed to the user at 508. At 510, it is determined whether the designated OIM is leaving the route portion and, if not, the process continues to stream monitor data for that route portion and continues to monitor the designated OIM to determine if it is leaving the route portion. If it has left a route portion, at 512, the monitor output is stopped being streamed for that route portion. At 514, it is determined whether the course (route) has ended and, if so, at 516, the process ends. If the course has not ended, the process determines is the designated OIM is entering a new route portion at 506. If so, at 508, the data feed is switched to the feed for the new route portion and streamed to the user. The process continues as such until the course has ended.

Figure 6:
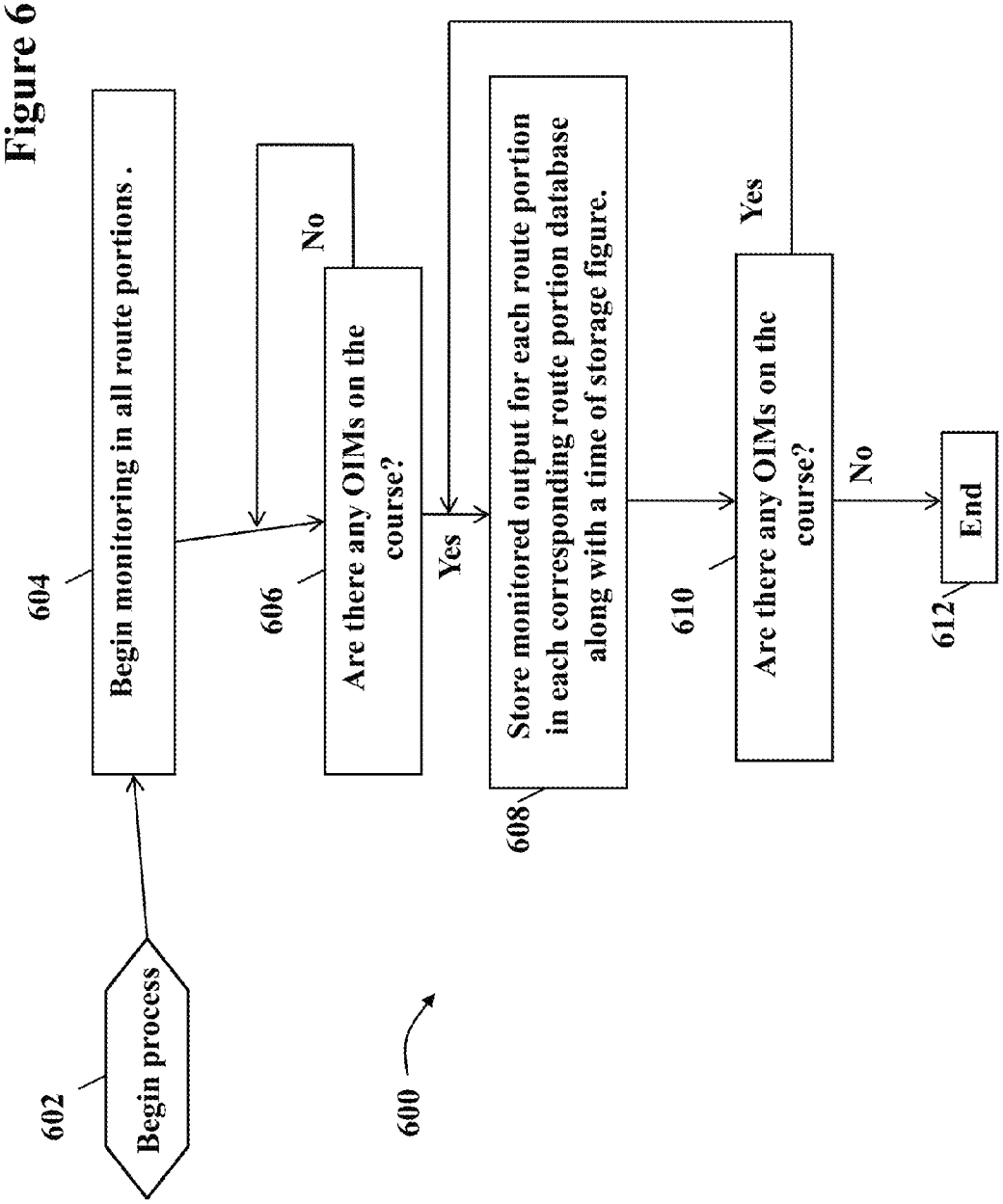
FIG. 6 illustrates one embodiment of a method for storing monitor output in various data storage units corresponding to various route portions or segments of the present invention.

FIG. 6 illustrates a process 600 wherein each SDD continuously provides monitor output for its respective sector or route portion that begins at 602 and continues to 604 where monitor output is provided by each SDD. At 606, it is determined if there are any OIMs on the course (route). If not, the process continues to monitor if there are any OIMs on the course. If there are OIMs on the course, at 608, the monitor output for each route portion is stored in each corresponding route portion database along with a time of storage value. At 610, it is determined if there are any OIMs on the course (route). If not, the process ends at 612. If there are OIMs on the course, the process continues at 608 and the monitor output for each route portion is continued to be stored in each corresponding route portion database along with a time of storage value.

Figure 7:
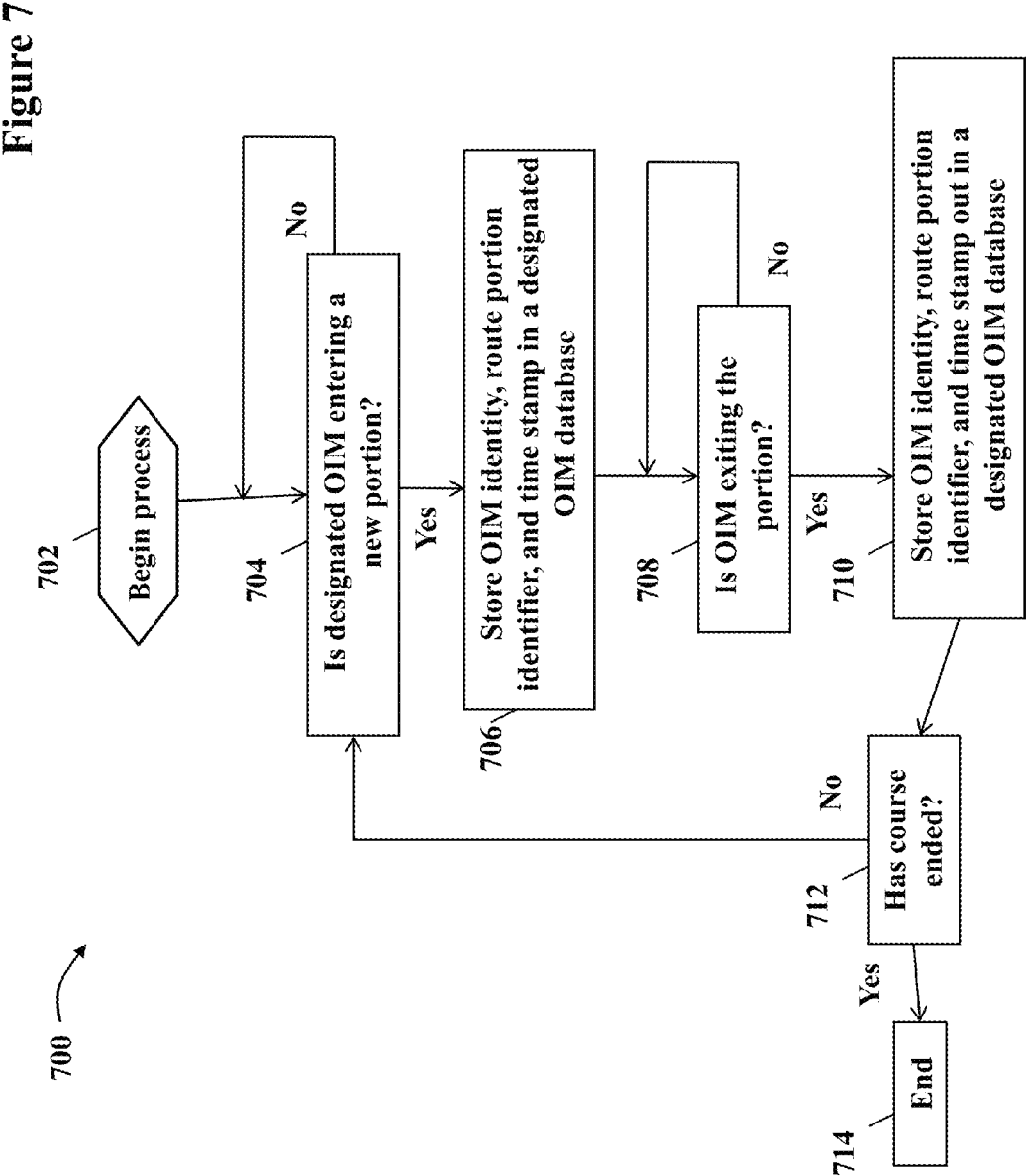
FIG. 7 illustrates an embodiment of a method for storing data related to movement of a designated OIM along a static route of the present invention.

FIG. 7 illustrates a method 700 for storing identifying data for a designated OIM for each route portion and storing time stamps associated with the entry time and exit time for each portion so that the monitor outputs can be identified from the route portion database. The method begins at 702 and continues to 704 where it is determined whether the designated OIM is entering a new portion and, if not, the method continues to monitor whether the designated OIM is entering a new route portion (segment). If the designated OIM is entering a new route portion (segment), at 706, a designated OIM identity, a route portion identifier, and a time stamp in is stored in a designated OIM database. At 708, it is determined whether the designated OIM is exiting the route portion and, if not, the process continues at 708 to monitor whether the OIM is exiting the route portion while storing the monitor output. If it is determined that the designated OIM is exiting the route portion, at 710, the OIM identity, the route portion identifier, and the time stamp out are stored in the respective designated OIM database. At 712, it is determined whether the course has ended and, if not, the method continues at 704 where it is determined whether the OIM is entering a new portion and the method proceeds as discussed above. If, at 712, it is determined that the course has ended, at 714, the method ends.

FIG. 8 illustrates a method 800 of extracting monitor outputs associated with a designated OIM from the various route portion databases and compiling (appending) the monitor outputs in a time sequential manner in a single file. The method begins at 802 and continues to 804 where the designated OIM identity, the first route portion identifier, and time stamp in and time stamp out are retrieved from the designated OIM database. At 806, the stored monitor output for first route portion is extracted from first route portion database based upon the designated OIM identity, first route portion identifier, time stamp in and time stamp out. At 808, the monitor output is stored to the designated OIM database. At 810, the method retrieves from designated OIM database the designated OIM identity, next route portion identifier, time stamp in and time stamp out. At 812, the method extracts and appends the monitor output for the next route portion from next route portion database to designated OIM database based upon designated OIM identity, next route portion identifier, time stamp in and time stamp out. At 814, it is determined whether the data for the OIM/course has ended. If so, the method ends at 816. If, at 814, it is determined that the data for the OIM/course has not ended, the method continues at 812 as discussed hereinabove.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for monitoring OIMs along a static route using sensory detection devices, it is understood that the invention further provides various alternative embodiments. For example, in one embodiment, the invention provides a computer-readable/useable medium that includes computer program code to provide a solution for monitoring OIMs along a static route using sensory detection devices. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for monitoring OIMs along a static route using sensory detection devices. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

In another embodiment, the invention provides a business method that performs the process steps of the invention on a subscription, advertising, and/or fee basis. That is, a service provider, such as a solution integrator, could offer to provide a solution for protecting copyrighted material in a virtual world. In this case, the service provider can create, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for monitoring objects in motion (OIMs), the method comprising:
    assigning a first location determination tag to a first participant, the first location determination tag having a transmitter that transmits a location thereof;
    receiving an indication identifying a designated OIM associated with the first participant along a static route of a sporting event using a system having a plurality of fixed sensory input devices positioned along the static route based on the location transmitted by the location determination tag being within a designated area associated with a fixed sensory input devices of the plurality of fixed sensory input devices, the static route having a set of pre-defined route portions, each route portion having at least one sensory input device for continuously monitoring activity in that route portion;
    continuously determining a real-time location of the designated OIM along the static route;
    generating a monitored output representing all activity monitored in each route portion using the at least one sensory input device for each route portion, the monitored output comprising a video feed;
    storing the monitored output for each route portion in respective route portion databases along with a time of storage value;
    storing a time of entry into and a time of exit from each route portion for the OIM in a designated OIM database;
    retrieving the time of entry into and the time of exit from each route portion for the OIM;
    extracting, from the stored monitor output for each route portion, a section of the stored monitor output for each route portion corresponding to the period of time between each respective time of entry into and time of exit from each route portion for the OIM as compared against the time of storage value of the monitor output for each route portion; and
    assembling, chronologically, the section of the stored monitor output extracted for each route portion for the OIM according to the period of time between each respective time of entry into and time of exit from each route portion.

2. A method for monitoring objects in motion (OIMs), the method comprising:
    assigning a first location determination tag to a first participant, the first location determination tag having a transmitter that transmits a location thereof;
    receiving an indication identifying a designated OIM associated with the first participant along a static route of a sporting event using a system having a plurality of fixed sensory detection devices positioned along the static route based on the location transmitted by the location determination tag being within a designated area associated with a fixed sensory input devices of the plurality of fixed sensory input devices, the static route having a plurality of pre-defined route portions, each route portion having at least one sensory detection device for continuously monitoring OIM activity in that route portion;
    generating a monitor output for each route portion representing all activity in that route portion, the monitor output comprising one or more video feeds;
    storing the monitor output for each route portion in respective route portion databases along with a time of storage value;
    continuously determining a real-time location of the designated OIM along the static route;
    storing a time of entry into and a time of exit from each route portion for the OIM in a designated OIM database;
    retrieving the time of entry into and the time of exit from each route portion for the OIM;
    extracting, from the stored monitor output for each route portion, a section of the stored monitor output for each route portion corresponding to the period of time between each respective time of entry into and time of exit from each route portion for the OIM as compared against the time of storage value of the monitor output for each route portion; and
    assembling, chronologically, the section of the stored monitor output extracted for each route portion for the OIM according to the period of time between each respective time of entry into and time of exit from each route portion.

3. The method as defined in claim 2 further comprising:
determining if the designated OIM is entering a route portion;
if the designated OIM is entering a route portion, generating a time stamp in representing the time the designated OIM entered the route portion;
storing the time stamp in, an identifier for the designated OIM and an identifier for the route portion;
determining if the designated OIM is exiting the route portion;
if the designated OIM is exiting the route portion, generating a time stamp out representing the time that the designated OIM exited the route portion; and
determining if there are any more route portions and, if there are any more route portions, returning to the determining if the designated OIM is entering a route portion step.

4. The method as defined in claim 3 further comprising determining if there are any other designated OIMs on the route and, if there are no more designated OIMs on the route, stopping the storing of the monitored output.

5. The method as defined in claim 3 further comprising:
retrieving the time stamps in and the time stamps out for each route portion from the designated OIM database; and
extracting from each route portion database the stored monitor output for the period of time between each respective time stamp in and time stamp out as compared against the time of storage of the monitor output.

6. The method as defined in claim 5 further comprising storing the extracted monitor outputs in a time sequential manner according to the time stamps in and time stamps out in a database for the designated OIM.

7. A system for monitoring a plurality of objects in motion (OIMs) along a static route using a plurality of sensory detection devices, the system comprising:
a first location determination tag assigned to a first participant, the first location determination tag having a transmitter that transmits a location thereof;
a plurality of fixed sensory detection devices positioned along the static route of a sporting event and corresponding to a plurality of pre-defined route portions for continuously monitoring activity in each of the plurality of route portions based on the location transmitted by the location determination tag being within a designated area associated with a fixed sensory input devices of the plurality of fixed sensory input devices and for providing monitor output representing all activity monitored within each of the plurality of route portions, the monitor output comprising a video feed;
a plurality of data stores corresponding to each of the plurality of route portions for receiving and storing the monitor output for each of the plurality of route portions;
a plurality of location detectors communicative with a tag physically coupled with the designated OIM associated with the first participant for identifying the location of the designated OIM, each location detector providing output when the designated OIM is located within a route portion; and
an application consolidation system connected to the plurality of storage units configured to:
extract, from the stored monitor output for each route portion, a section of the stored monitor output for each route portion corresponding to the period of time between each respective time of entry into and time of exit from each route portion for the OIM as compared against the time of storage value of the monitoroutput for each route portion;
assemble, chronologically, each section of the stored monitor output extracted for each route portion for the OIM.

8. The system as defined in claim 7 further comprising a streaming unit connected to the plurality of sensory detection devices for receiving monitor output representing activity within each of the plurality of route portions and connected to the plurality of location detectors for identifying the location of the designated OIM, wherein the streaming unit streams the received monitor output from each of the plurality of route portions to a user when the designated OIM is located in that route portion.

9. A computer program product embodied in a computer readable medium for operating in a system comprising a processing unit, a memory, a bus, and input/output (I/O) interfaces, for implementing a method for monitoring objects in motion (OIMs) along a static route, the method comprising:
assigning a first location determination tag to a first participant, the first location determination tag having a transmitter that transmits a location thereof;
receiving an indication identifying a designated OIM associated with the first participant along the static route of a sporting event using a plurality of fixed sensory input devices positioned along the static route based on the location transmitted by the location determination tag being within a designated area associated with a fixed sensory input devices of the plurality of fixed sensory input devices;
generating a monitor output representing all activity continuously monitored for each pre-defined route portion, the monitoring outputs comprising one or more video feeds;
storing the monitor output for each route portion in respective route portion databases along with a time of storage value;
continuously determining a real-time location of the designated OIM along the static route;
storing a time of entry into and a time of exit from each route portion for the OIM in a designated OIM database;
retrieving the time of entry into and the time of exit from each route portion for the OIM;
extracting, from the stored monitor output for each route portion, a section of the stored monitor output for each route portion corresponding to the period of time between each respective time of entry into and time of exit from each route portion for the OIM as compared against the time of storage value of the monitor output for each route portion; and
assembling, chronologically, the section of the stored monitor output extracted for each route portion for the OIM according to the period of time between each respective time of entry into and time of exit from each route portion.

10. The computer program product as defined in claim 9 wherein the method further comprises:
determining if the designated OIM is entering a route portion;
if the designated OIM is entering a route portion, generating a time stamp in representing the time the designated OIM entered the route portion;
storing the time stamp in, an identifier for the designated OIM and an identifier for the route portion;

determining if the designated OIM is exiting the route portion;

if the designated OIM is exiting the route portion, generating a time stamp out representing the time that the designated OIM exited the route portion; and determining if there are any more route portions and, if there are more route portions, returning to the determining if the designated OIM is entering a route portion.

11. The computer program product as defined in claim 10 wherein the method further comprises determining if there are any other designated OIMs on the route and, if there are no other designated OIMs on the route, stopping the storing of the monitored output.

12. The computer program product as defined in claim 11 wherein the method further comprises retrieving the time stamps in and the time stamps out for each route portion for the designated OIM and extracting from each route portion database the stored monitor output for the period of time between each respective time stamp in and time stamp out as compared against the time of storage of the monitor output.

13. The computer program product as defined in claim 12 wherein the method further comprises storing the extracted monitor outputs in a time sequential manner according to the time stamps in and time stamps out in a database for the designated OIM.

14. The computer program product as defined in claim 10 wherein the method further comprises streaming the monitored output from each route portion when the designated OIM is located in that route portion.

15. A method for deploying a computing infrastructure, comprising integrating computer-readable code into a computing system, wherein the code in combination with the computing system is capable of performing a process for monitoring objects in motion (OIMs), the process comprising:

assigning a first location determination tag to a first participant, the first location determination tag having a transmitter that transmits a location thereof;

receiving an indication identifying a designated OIM associated with the first participant along a static route of a sporting event using a system having a plurality of fixed sensory input devices based on the location transmitted by the location determination tag being within a designated area associated with a fixed sensory input devices of the plurality of fixed sensory input devices, the static route having a set of pre-defined route portions, each route portion having at least one sensory input device for continuously monitoring OIM activity in that route portion;

generating a monitor output representing all activity monitored in each route portion using the at least one sensory input device for each route portion, the monitor output comprising a video feed;

storing the monitor output from each route portion in a route portion database for that route portion along with a time of storage;

continuously determining a real-time location of the designated OIM along the static route;

generating a time stamp in representing the time the designated OIM entered the route portion;

storing the time stamp in, an identifier for the designated OIM and an identifier for the route portion;

determining if the designated OIM is exiting the route portion;

generating a time stamp out representing the time that the designated OIM exited the route portion; storing the time stamp out, the identifier for the designated OIM and the identifier for the route portion retrieving the time stamps in and the time stamps out for each route portion for the designated OIM;

extracting, from the stored monitor output for each route portion, a section of the stored monitor output for each route portion corresponding to the period of time between each respective time of entry into and time of exit from each route portion for the OIM as compared against the time of storage value of the monitor output for each route portion; and assembling, chronologically, the section of the stored monitor output extracted for each route portion for the OIM according to the period of time between each respective time of entry into and time of exit from each route portion.

16. The method as defined in claim 15 wherein the process further comprises determining if there are any more OIMs on the route and, if there are no more OIMs on the route, stopping the storing of the monitored output.

17. The method as defined in claim 16 wherein the process further comprises storing the extracted monitor outputs in a time sequential manner according to the time stamps in and time stamps out in a database for the designated OIM.

18. The method as defined in claim 16 wherein the process further comprises streaming the monitored output from each route portion when the designated OIM is located in that route portion.

* * * * *